US008995991B2

(12) United States Patent
Terry

(10) Patent No.: US 8,995,991 B2
(45) Date of Patent: *Mar. 31, 2015

(54) POINT TO MULTI-POINT SERVICES USING SHARED CHANNELS IN WIRELESS COMMUNICATION

(75) Inventor: Stephen E. Terry, Northport, NY (US)

(73) Assignee: InterDigital Technology Corporation, Wilmington, DE (US)

(*) Notice: Subject to any disclaimer, the term of this patent is extended or adjusted under 35 U.S.C. 154(b) by 229 days.

This patent is subject to a terminal disclaimer.

(21) Appl. No.: 10/426,377

(22) Filed: Apr. 30, 2003

(65) Prior Publication Data

US 2003/0228865 A1 Dec. 11, 2003

Related U.S. Application Data

(60) Provisional application No. 60/377,037, filed on May 1, 2002.

(51) Int. Cl.
*H04W 24/00* (2009.01)
*H04W 72/12* (2009.01)
(Continued)

(52) U.S. Cl.
CPC ........ *H04W 72/1226* (2013.01); *H04W 72/005* (2013.01); *H04B 7/0617* (2013.01);
(Continued)

(58) Field of Classification Search
CPC ........... H04W 72/005; H04W 72/1226; H04B 7/0617
USPC ............ 455/422.1, 432.1, 450, 454, 502, 503
See application file for complete search history.

(56) References Cited

U.S. PATENT DOCUMENTS 5,418,937 A 5/1995 Inoue
5,570,366 A 10/1996 Baker et al.
(Continued)

FOREIGN PATENT DOCUMENTS

EP 1006740 6/2000
EP 1077539 A1 2/2001
(Continued)

OTHER PUBLICATIONS

Third Generation Partnership Project, "Technical Specification Group GSM/EDGEtRadio Access Network; Multiplexing and multiple access on the radio path (Release 4)," 3GPP TS45.002 V4.5.0 (Nov. 2001).

(Continued)

*Primary Examiner* — Wesley Kim
*Assistant Examiner* — Richard Chan
(74) *Attorney, Agent, or Firm* — Volpe and Koenig, P.C.

(57) ABSTRACT

Service data is transferred in a wireless communication system. A first service identification is synchronously transmitted for reception by a group of users of a cell in the system. The group of users does not include all of the users of the cell. Each of the group of users receives the service identification. Each of the group of users monitors for a second service identification being transmitted over a downlink shared channel. The service data is transmitted over the downlink shared channel with the second service identification. Each of the group of users detects the second service identification and receives the service data of the downlink shared channel.

10 Claims, 7 Drawing Sheets

(51) Int. Cl.
*H04W 72/00* (2009.01)
*H04B 7/06* (2006.01)
*H04W 16/28* (2009.01)
*H04W 48/08* (2009.01)
*H04W 52/42* (2009.01)

(52) U.S. Cl.
CPC .............. *H04B7/0634* (2013.01); *H04W 16/28* (2013.01); *H04W 48/08* (2013.01); *H04W 52/42* (2013.01); *H04W 72/1236* (2013.01)
USPC .................... 455/425; 455/422.1; 455/432.1; 455/450; 455/454; 455/502

(56) References Cited

U.S. PATENT DOCUMENTS

| | | |
|---|---|---|
| 5,648,961 A | 7/1997 | Ebihara |
| 5,761,619 A | 6/1998 | Danne et al. |
| 5,940,756 A | 8/1999 | Sibecas et al. |
| 5,978,368 A | 11/1999 | Hjelm et al. |
| 6,031,490 A | 2/2000 | Mazur et al. |
| 6,188,911 B1 | 2/2001 | Wallentin et al. |
| 6,308,079 B1 | 10/2001 | Pan et al. |
| 6,347,234 B1 | 2/2002 | Scherzer |
| 6,349,210 B1 | 2/2002 | Li |
| 6,385,461 B1* | 5/2002 | Raith ........................... 455/518 |
| 6,392,572 B1 | 5/2002 | Shiu et al. |
| 6,529,740 B1 | 3/2003 | Ganucheau et al. |
| 6,549,317 B1 | 4/2003 | Jung et al. |
| 6,621,805 B1* | 9/2003 | Kondylis et al. ............. 370/329 |
| 6,650,649 B1 | 11/2003 | Muhammad et al. |
| 6,738,640 B1 | 5/2004 | Baker et al. |
| 6,804,528 B1 | 10/2004 | Laroia et al. |
| 6,855,401 B2 | 2/2005 | Feldmen et al. |
| 6,950,684 B2 | 9/2005 | Goldberg |
| 6,954,136 B2* | 10/2005 | Sauer ........................... 340/7.46 |
| 6,965,579 B1* | 11/2005 | Shin .............................. 370/312 |
| 6,965,580 B1 | 11/2005 | Takagi et al. |
| 6,996,061 B2 | 2/2006 | Yang et al. |
| 7,116,983 B2 | 10/2006 | Lan et al. |
| 7,206,291 B2 | 4/2007 | Soldani et al. |
| 7,218,663 B1 | 5/2007 | Yokota et al. |
| 7,227,850 B2* | 6/2007 | Dahlman et al. ............. 370/330 |
| 7,245,595 B2 | 7/2007 | Kim et al. |
| 7,292,854 B2 | 11/2007 | Das et al. |
| 7,366,133 B1* | 4/2008 | Majidi-Ahy et al. ......... 370/329 |
| 2001/0016497 A1 | 8/2001 | Al-Housami |
| 2001/0022784 A1 | 9/2001 | Menon et al. |
| 2001/0030956 A1 | 10/2001 | Chillariga et al. |
| 2001/0033581 A1 | 10/2001 | Kawarai et al. |
| 2001/0046220 A1* | 11/2001 | Koo et al. ..................... 370/335 |
| 2001/0046877 A1 | 11/2001 | Ohkubo et al. |
| 2002/0009061 A1 | 1/2002 | Willenegger |
| 2002/0010001 A1 | 1/2002 | Dahlman et al. |
| 2002/0037736 A1 | 3/2002 | Kawaguchi et al. |
| 2002/0071415 A1 | 6/2002 | Soualabail et al. |
| 2002/0075822 A1 | 6/2002 | Costa et al. |
| 2002/0102967 A1 | 8/2002 | Chang et al. |
| 2002/0106985 A1 | 8/2002 | Sato et al. |
| 2002/0115466 A1 | 8/2002 | Kanemoto et al. |
| 2002/0119717 A1 | 8/2002 | Taylor, Jr. et al. |
| 2002/0136193 A1 | 9/2002 | Chang et al. |
| 2002/0141331 A1 | 10/2002 | Mate et al. |
| 2002/0181423 A1* | 12/2002 | Chen et al. .................... 370/337 |
| 2003/0035423 A1 | 2/2003 | Beckmann et al. ........... 370/390 |
| 2003/0039232 A1* | 2/2003 | Casati et al. .................. 370/337 |
| 2003/0054807 A1 | 3/2003 | Hsu et al. |
| 2003/0095605 A1* | 5/2003 | Das et al. ...................... 375/262 |
| 2003/0112778 A1 | 6/2003 | Lundby |
| 2003/0123382 A1 | 7/2003 | Wang et al. |
| 2003/0134622 A1 | 7/2003 | Hsu et al. |
| 2003/0137401 A1* | 7/2003 | Sauer ........................... 340/7.46 |
| 2003/0157949 A1* | 8/2003 | Sarkkinen et al. ............ 455/503 |
| 2003/0176192 A1* | 9/2003 | Morimoto et al. ............ 455/453 |
| 2003/0220119 A1 | 11/2003 | Terry et al. |
| 2003/0228865 A1 | 12/2003 | Terry et al. |
| 2004/0014429 A1 | 1/2004 | Guo |
| 2004/0190525 A1 | 9/2004 | Lepisaari et al. |
| 2005/0203990 A1* | 9/2005 | Weksel ......................... 709/201 |
| 2005/0212659 A1* | 9/2005 | Sauer ........................... 340/7.46 |
| 2009/0103514 A1 | 4/2009 | Hwang et al. |

FOREIGN PATENT DOCUMENTS

| | | |
|---|---|---|
| EP | 1161004 | 12/2001 |
| EP | 1517573 | 9/2005 |
| JP | 2001-053675 | 2/2001 |
| JP | 2001-308784 | 11/2001 |
| JP | 2002-051006 | 2/2002 |
| JP | 2002-064878 | 2/2002 |
| WO | 99/08457 | 2/1999 |
| WO | 99/11032 | 3/1999 |
| WO | 99/14870 | 3/1999 |
| WO | 99/44376 | 9/1999 |
| WO | 9952304 A1 | 10/1999 |
| WO | 00/30375 | 5/2000 |
| WO | 00/62547 | 10/2000 |
| WO | 01/22234 | 3/2001 |
| WO | 02/01893 | 1/2002 |
| WO | 02/32017 | 4/2002 |
| WO | 2004/051873 | 6/2004 |

OTHER PUBLICATIONS

Third Generation Partnership Project, "Technical Specification Group GSM/EDGE Radio Access Network; General Packet Radio Service (GPRS); Base Station (BSS)—Serving GPRS Support Node (SGSN); BSS GPRS Protocol (BSSGP) (Release 5)," 3GPP TS 48.018 V5.6.1 (Apr. 2003).

Third Generation Partnership Project, "Technical Specification Group Services and System Aspects; Vocabulary for 3GPP Specifications (Release 5)," 3G TR 21.905 V5.3.0 (Mar. 2002).

Third Generation Partnership Project, "Technical Specification Group GSM/EDGE Radio Access Network; General Packet Radio Service (GPRS); Mobile Station (MS)—Base Station (BSS) interface; Radio Link Control/Medium Access Control (RLC/MAC) protocol (Release 5)," 3GPP TS 44.060 V5.6.0 (Apr. 2003).

Third Generation Partnership Project, "Technical Specification Group Radio Access Network; MAC Protocol Specification (Release 4),"3GPP TS 25.321 v4.8.0 (Mar. 2003).

Third Generation Partnership Project, "Technical Specification Group Radio Access Network; High Speed Downlink Packet Access (HSDPA); Overall Description; Stage 2 (Release 5),"3GPP TS 25.308 V5.2.0 (Mar. 2002).

Third Generation Partnership Project, "Technical Specification Group GERAN; Digital cellular telecommunication system (Phase 2+); General Packet Radio Service (GPRS); Overall description of the GPRS radio interface; Stage 2 (Release 4)," 3GPP TS 43.064 V4.4.0 (Apr. 2003).

Third Generation Partnership Project, "Technical Specification Group Core Network; Mobile radio interface Layer 3 specification, Core network protocols; Stage 3 (Release 1999)," 3GPP TS 24.008 V3.11.0 (Mar. 2002).

Siemens, "Discussion of requirements of a MBMS transport channel," TSG-RAN WG2 meeting #28, R2- 020732 (Apr. 8-12, 2002).

Third Generation Partnership Project, "Technical Specification Group GEREN; Digital cellular telecommunications system (Phase 2+); General Packet Radio Service (GPRS); Overall description of the GPRS radio interface; Stage 2 (Release 5)," 3GPP TS 43.064 V5.1.0 (Dec. 2002).

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (Release 6)," 3GPP TS 48.018 V6.1.0 (Apr. 2003).

Third Generation Partnership Project, "Technical Specification Group GSM/EDGE Radio Access Network; Mobile radio interface layer 3 specification; Radio Resource Control Protocol (Release 4)," 3GPP TS44018 V4.8.0 (Feb. 2002).

(56) References Cited

OTHER PUBLICATIONS

Third Generation Partnership Project, "Technical Specification Group GSM/EDGE Radio Access Network; Mobile radio interface layer 3 specification; Radio Resource Control Protocol (Release 4)," 3GPP TS44018 V4.14 (Apr. 2003).

Third Generation Partnership Project, "Technical Specification Group GSM/EDGE Radio Access. Network; Mobile Station—Base Station System (MS-BSS) interface; Channel structures and access capabilities (Release 4)," 3GPP TS 44.003 V4.0.0 (Apr. 2001).

Third Generation Partnership Project, "Technical Specification Group Core Network; Mobile radio interface Layer 3 specification; Core network protocols; Stage 3 (Release 5),"3GPP TS 24.008 V5.3.0 (Mar. 2002).

Third Generation Partnership Project, "Technical Specification Group GSM/EDGE Radio Access Network; Multiplexing and multiplex access on the radio path (Release 6)," 3GPP TS45.002 V6.1.0 (Apr. 2003).

Third Generation Partnership Project, "Technical Specification Group GSM/EDGE Radio Access Network; General Packet Radio Service (GPRS); Base System (BSS)—Serving GPRS Support Node (SGSN); BSS GPRS Protocol (BSSGP) (Release 4)," 3GPP TS 48.018 V4.5.0 (May 2002).

Third Generation Partnership Project, "Technical Specification Group GSM/EDGE Radio Access Network; Mobile radio interface layer 3 specification; Radio Resource Control Protocol Release 4)," 3GPP TS44.018 V4.8.0 (Feb. 2002).

Siemens, "Discussion of requirements of a MBMS transport channel," TSG-RAN WG2 meeting #28, R2-020732 )Apr. 8-12, 2002).

Third Generation Partnership Project, "Technical Specification Group GERAN; Digital cellular telecommunications system (Phase 2+); General Packet Radio Service (GPRS); Overall descriptoin of the GPRS radio interface; Stage 2 (Release 5)," 3GPP TS 43.064 V5.1.0 (Dec. 2002).

Third Generation Partnership Project, "Technical Specification Group Services and System Aspects; Multimedia Broadcast/Multicast Service; Stage 1 (Release 5)," 3GPP TS 22.146 V6.2.0 (Mar. 2002).

Third Generation Partnership Project, "Technical Specification Group Core Network; Mobile radio interface Layer 2 specification; Core network protocols; Stage 3 (Release 1999)," 3GPP TS 24.008 V3.11.0 (Mar. 2002).

Third Generation Partnership Project, "Technical Specification Group GSM/EDGE Radio Access Network; General Packet Radio Service (GPRS); Base Station Sytem (BSS)—Serving GPRS Support Node (SGSN); BSS GPRS Protocol (BSSGP) (Release 5)," 3GPP TS 48.018 V5.6.1 (Apr. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol )Release 5)," 3GPP TS 44.060 V5.0.0 (Feb. 2002)

Third Generation Partnership Project, "Technical Specification Group GSM/EDG Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.6.0 (Apr. 2003).

Third Generation Partnership Project, "Technical Specification Group Radio Access Network; Radio Resource Control (RRC); Protocol Specification (Release) 5)," 3GPP TS 25.331 V5.4.0 (Mar. 2003).

Third Generation Partnership Project, "Technical Specification Group Radio Access Network; Radio Resource Control (RRC), Protocol Specification (Release 4)," 3GPP TS 25.331 V4.9.0 (Mar. 2003).

Third Generation Partnership Project, "Technical Specification Group GSM/EDGE Radio Access Network; Mobile Station System (MS-BSS) interface; Channel structures and access capabilities (Release 4)," 3GPP TS 44.003 V4.0.0 (Apr. 2001).

Third Generation Partnership Project, "Technical Specification Group Core Network; Mobile radio interface Layer 3 specification; Core network protocols; Stage 3 (Release 4)," 3GPP TS 24.008 V4.6.0 )Mar. 2002).

Third Generation Partnership Project, "Technical Specification Group GSM/EDGE Radio Access Network; Multiplexing and multiple access on the radio path (Release 4),"3GPP TS45.002 V4.7.0 (Apr. 2003).

Third Generation Partnership Project, "Technical Specification Group GSM/EDGE Radio Access Network; Multiplexing access on the radio path (Release 5)," 3GPP TS45.002 V5.9.0 (Apr. 2003).

Third Generation Partnership Project, "Technical Specification Group GSM/EDGE Radio Access Network; Multiplexing and multiple access on the radio path (Release 5)," 3GPP TS45.002 V4.5.0 (Feb. 2002).

Third Generation Partnership Project, "Technical Specification Group GSM/EDGE Radio Access. Network; General Packet Radio Service (GPRS); Base Sation System (BSS)—Serving GPRS Support Node (SGSN); BSS GPRS Protocol (BSSGP) (Release 4)," 3GPP TS 48.018 V4.5.0 (May 2002).

Third Generation Partnership Project, "Technical Specification Group GSM/EDGE Radio Access. Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.2.0 (Apr. 2003).

Third Generation Partnership Project, "Technical Specification Group GSM/EDGE Radio Access Network; Mobile radio interface layer 3 specification; Radio Resource Control Protocol (Release 4)," 3GPP TS 44.018 V4.14 (Apr. 2003).

Third Generation Partnership Project, "Technical Specification Group GSM/EDGE Radio Access Network; Mobile radio interface layer 3 specification; Radio Resource Control Protocol (Release 6)," 3GPP TS 44.018 V6.2.0 (Apr. 2003).

Third Generation Partnership Project, "Technical Specification Group GSM/EDGE Radio Access Network; Layer 1; General requirements (Release 4)," TS 44.004 V4.2.0 (Dec. 2001).

Third Generation Partnership Project, "Technical Specification Group Radio Access Network; Physical layer procedures (FDD) (Release 5)," TS 25.214 V5.0.0 (Mar. 2002).

Third Generation Partnership Project, "Technical Specification Group Radio Access Network; Physical layer procedures (FDD (Release 5)," 3GPP TS 25.214 V5.4.0 (Mar. 2003).

Third Generation Partnership Project, "Technical Specification Group Services and System Aspects; Multimedia Broadcaast/Multicast Service; Stage 1 (Release 5)," 3GPP TS 22.146 V5.2.0 (Mar. 2002).

Third Generation Partnership Project, "Technical Specification Group GSM/EDGE Radio Access Network; General Packet Radio Service (GPRS); Base Station System (BSS)—Serving GPRS Suppor Node (SGSN); BSS GPRS Protocol (BSSGP) (Release 4)," 3GPP TS 48.018 V4.5.0 (May 2002).

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 4)," TS 48.018 V4.4.0 (Sep. 2001).

Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 6)" 3GPP TS 48.018 V6.1.0 (Apr. 2003).

Frodigh et al., "Future-Generation Wireless Networks," IEEE Personal Communications, vol. 8, No. 5 (Oct. 2001).

IEEE Standard for Local and metropolitan area networks Part 16: Air Interface for Fixed Broadband Wireless Access Systems, IEEE Std. 802.16-2001 (Apr. 8, 2002).

Kohno et al., "Evolution and Demands of SoC in ITS and Mobile Communication Systems," Proceedings of the International Symposium on Semiconductor Manufacturing, pp. 1-5 (Jun. 1999).

Third Generation Partnership Project, "Technical Specification Group GERAN; Digital cellular telecommunications system (Phase

(56) References Cited

OTHER PUBLICATIONS

2+); General Packet Radio Service (GPRS); Overall description of the GPRS radio interface; Stage 2 (Release 4)," 3GPP TS 43.064 V4.3.0 (Dec. 2002).
Third Generation Partnership Project, "Technical Specification Group GERAN; Digital cellular telecommunications system (Phase 2+); General Packet Radio Service (GPRS); Overall desciption of the GPRS radio interface; Stage 2 (Release 4)," 3GPP TS 43.064 V4.4.0 (Apr. 2003).
Third Generation Partnership Project, "Technical Specification Group GSM/EDGE Radio Access Network; Multiplexing and multiple access on the radio path (Release 5)," 3GPP TS45.002 V5.9.0 (Apr. 2003).
Third Generation Partnership Project, "Technical Specification Group GSM/EDGE Radio Access Network; Multiplexing and multiple access on the radio path (Release 6)," 3GPP TS 45.002 V6.1.0 (Apr. 2003).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 4)," 3GPP TS 48.018 V4.5.0 (May 2002).
Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.11.0 (Apr. 2003).
Third Generation Partnership Project, "Technical Specification Group Radio Access Network; Radio Resource Control (RRC); Protocol Specification (Release 4)," 3GPP TS 25.331 V4.9.0 (Mar. 2003).
Third Generation Partnership Project, "Technical Specification Group Radio Access Network; Radio Resource Control (RRC); Protocol Specification (Release 4)," 3GPP TS 25.331 V4.4.0 (Mar. 2002).
Third Generation Partnership Project, "Technical Specification Group Radio Access Network; Radio Resource Control (RRC) protocol specification (Release 1999)," 3GPP TS 25.331 V3.14.0 (Mar. 2003).
Third Generation Partnership Project, "Technical Specification Group Radio Access Network; Multiplexing and channel coding (FDD) (Release 1999)," 3GPP TS 25.212 V3.11.0 (Sep. 2002).
Third Generation Partnership Project, "Technical Specification Group Radio Access Network; Multiplexing and channel coding (FDD) (Release 4)," 3GPP TS 25.212 V4.6.0 (Sep. 2002).
Third Generation Partnership Project, "Technical Specification Group Radio Access Network; Multiplexing and channel coding (FDD) (Release 1999)," 3GPP TS 25.212 V3.9.0 (Mar. 2002).
Third Generation Partnership Project, "Technical Specification Group Radio Access Network; Multiplexing and channel coding (FDD) (Release 4)," 3GPP TS 25.212 V4.4.0 (Mar. 2002).
Third Generation Partnership Project, "Technical Specification Group Radio Access Network; Multiplexing and channel coding (FDD) (Release 5)," 3GPP TS 25.212 V5.0.0 (Mar. 2002).
Third Generation Partnership Project, "Technical Specification Group Radio Access Network; Multiplexing and channel coding (FDD) (Release 5)," 3GPP TS 25.212 V5.4.0 (Mar. 2003).
Third Generation Partnership Project, "Technical Specification Group Radio Access Network; Introduction of the Multimedia Broadcast Multicast Service (MBMS) in the Radio Access Network (Stage-2); (Release 6)," 3GPP TS 25.346 V1.3.0 (Jan. 2003).
Third Generation Partnership Project, "Technical Specification Group Radio Access Network; Radio Interface Protocol Architecture (Release 5)," 3GPP TS 25.301 V5.2.0 (Sep. 2002).
Third Generation Partnership Project, "Technical Specification Group Radio Access Network; Radio Interface Protocol Architecture (Release 5)," 3GPP TS 25.301 V5.0.0 (Mar. 2002).
Third Generation Partnership Project, "Technical Specification Group Radio Access Network; Radio Interface Protocol Architecture (Release 4)," 3GPP TS 25.301 V4.4.0 (Sep. 2002).
Third Generation Partnership Project, "Technical Specification Group Radio Access Network; Radio Interface Protocol Architecture (Release 1999)," 3GPP TS 25.301 V3.11.0 (Sep. 2002).
Third Generation Partnership Project, "Technical Specification Group Radio Access Network; Radio Interface Protocol Architecture (Release 1999)," 3GPP TS 25.301 V3.9.0 (Dec. 2001).
Third Generation Partnership Project, "Technical Specification Group Radio Access Network; Radio Interface Protocol Architecture (Release 4)," 3GPP TS 25.301 V4.2.0 (Dec. 2001).
3GPP TSG RAN WG4, "Liaison Statement on HSDPA open issues," TSG-RAN Working Group 4 (Radio) meeting #21, R4-020519 (Jan. 28-Feb. 1, 2002).
IEEE Standard for Local and metropolitan area networks Part 16: Air Interface for Fixed Broadband Wireless Access Systems, IEEE Std. 802. 16-2001 (Apr. 8, 2002).
Kohno et al., "Evolution and Demands of SoC in ITS and Mobile Communication Systems," Proceedings of the Symposium on Semiconductor Manufacturing, pp. 1-5 (Jun. 1999).
Sawahashi et al., "High-Speed Packet Wireless Access in W-CDMA and its Radio Link performance," Transaction of the Institute of Electronics, Information, and Communication Engineers, vol. J84-B, No. 10, pp. 1725-1745 (Oct. 2001). X**.
Third Generation Partnership Project, "Technical Specification Group GEREN; Digital cellular telecommunications system (Phase 2+); General Packet Radio Service (GPRS); Overall description of the GPRS radio interface; Stage 2 (Release 4)," 3GPP TS 43.064 V4.3.0 (Dec. 2002).
Third Generation Partnership Project, "Technical Specification Group Services and System Aspects; Multimedia Broadcast/ Multicast Service; Stage 1 (Release 5)," 3GPP TS 22.146 V5.2.0 (Mar.2002).
Third Generation Partnership Project, "Technical Specification Group GSM/EDGE Radio Access Network; General Packet Radio Service (GPRS); Base Station System (BSS)— Serving GPRS Support Node (SGSN); BSS GPRS Protocol (BSSGP) (Release 4)," 3GPP TS 48.018 V4.4.0 (Sep. 2001).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 5)," 3GPP TS 48.018 V5.10 (Dec. 2001).
Third Generation Partnership Project, "Technical Specification Group GSM/EDGE Radio Access Network; General Packet Radio Service (GPRS); Mobile Station (MS)—Base System (BSS) interface; Radio Link Control/Medium Access Control (RLC/MAC) protocol (Release 6)," 3GPP TS 44.060 V6.2.0 (Apr. 2003).
Third Generation Partnership Project, "Technical Specification Group Radio Access Network; Radio Resource Control (RRC); Protocol Specification (Release 5)," 3GPP TS 25.331 V5.0.0 (Mar. 2002)
Third Generation Partnership Project, "Technical Specification Group Radio Access Network; Physical layer procedures (FDD) (Release 5)," TS 25.214 V5.4.0 (Mar. 2003).
Third Generation Partnership Project, "Technical Specification Group Radio Access Network; Physical layer precedures (FDD) (Release 4)," 3GPP TS 25.214 V4.6.0 (Mar. 2003).
LG Electronics, "Use of DSCH for MBMS Multicast Mode," TSG-RAN Working Group 2 Meeting #32, R2-022573 (Sep. 23-27, 2002).
3GPP TSG RAN WG1, "Response to Liaison Statement R4-020519 on HSDPA Open Issues," TSG-RAN Working Group 1 Meeting #24, R1-02-0479 (Feb. 18-22, 2002).
Eyceoz et al., "Adaptive Prediction, Tracking and Power Adjustment for Frequency Non-Selective Fast Fading Channels," Communication Theory Mini-Conference, pp. 6-10 (Sep. 2000).
Frodigh et al., "Future-Generation Wireless Networks," IEEE Personal Communications, vol. 8, No. 5. (Oct. 2001).
Kohno et al., "Evolution and Demands of SoC in ITS and Mobile Communication Systems," Proceedings of the International Symposium on Semiconducor Manufacturing, pp. 1-5 (Jun. 1999).
Motorola, "Proposed CR 001 to TS25.308 [REL-5] on Update to HSDPA Stage 2," 3GPP TSG-RAN WG2 Meeting #25, R2-012753 (Nov. 26-30, 2001).
Sawahashi et al., "High-Speed Packet Wireless Access in W-CDMA and its Radio Link performance," Transactions of the Institute of

(56) References Cited

OTHER PUBLICATIONS

Electronics, Information, and Communication Engineers, vol. J84-B, No. 10, pp. 1725-1745 (Oct. 2001). X**.
Siemens, "Discussion of requirements of a MBMS transport channel," TSG-RAN WG2 meeting #28, R2-020732 (Apr. 8-12, 2002).
Third Generation Partnership Project, "Technical Specification Group Radio Access Network; MAC Protocol Specification (Release 1999)," 3GPP TS 25.321 v3.11.0 (Mar. 2002).
Third Generation Partnership Project, "Technical Specification Group Radio Access Network; MAC Protocol Specification (Release 1999)," 3GPP TS 25.321 v3.15.0 (Mar. 2003).
Third Generation Partnership Project, "Technical Specification Group Radio Access Network; MAC Protocol Specification (Release 4)," 3GPP TS 25.321 v4.4.0 (Mar. 2002).
Third Generation Partnership Project, "Technical Specification Group Radio Access Network; MAC Protocol Specification (Release 4)," 3GPP TS 25.321 v4.8.0 (Mar. 2003).
Third Generation Partnership Project, "Technical Specification Group Radio Access Network; MAC Protocol Specification (Release 5)," 3GPP TS 25.321 v5.0.0 (Mar. 2002).
Third Generation Partnership Project, "Technical Specification Group Radio Access Network; MAC Protocol Specification (Release 5)," 3GPP TS 25.321 v5.4.0 (Mar. 2003).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; High Speed Downlink Packet Access (HSDPA); Overall Description; Stage 2 (Release 5)," 3GPP TS 25.308 V5.4.0 (Mar. 2003).
Third Generation Partnership Project, "Technical Specification Group GSM/EDGE Radio Access Network; Mobile Station—Base Station System (MS-BSS) interface; Channel structures and access capabilities (Release 4)," 3GPP TS 44.003 V4.0.0 (Apr. 2001).
Third Generation Partnership Project, "Technical Specification Group GSM/EDGE Radio Access Network; Mobile Station—Base Station System (MS-BSS) interface; Channel structures and access capabilities (Release 5)," 3GPP TS 44.003 V5.0.1 (Dec. 2002).
Third Generation Partnership Project, "Technical Specification Group GERAN; Digital cellular telecommunication system (Phase 2+); General Packet Radio Service (GPRS); Overall description of the GPRS radio interface; Stage 2 (Release 4)," 3GPP TS 43.064 V4.3.0 (Dec. 2002).
Third Generation Partnership Project, "Technical Specification Group GERAN; Digital cellular telecommunications system (Phase 2+); General Packet Radio Service (GPRS); Overall description of the GPRS radio interface; Stage 2 (Release 4)," 3GPP TS 43.064 V4.4.0 (Apr. 2003).
Third Generation Partnership Project, "Technical Specification Group GERAN; Digital cellular telecommunications system (Phase 2+); General Packet Radio Service (GPRS); Overall description of the GPRS radio interface; Stage 2 (Release 5)," 3GPP TS 43.064 V5.1.0 (Dec. 2002).
Third Generation Partnership Project, "Technical Specification Group Services and System Aspects; Multimedia Broadcast/Multicast Service; Stage 1 (Release 6)," 3GPP TS 22.146 V6.2.0 (Mar. 2003).
Third Generation Partnership Project, "Technical Specification Group Services and System Aspects; Multimedia Broadcast/Multicast Service; Stage 1 (Release 5)," 3GPP TS 22.146 V5.2.0 (Mar. 2002).
Third Generation Partnership Project, "Technical Specification Group Core Network; Mobile radio interface Layer 3 specification; Core network protocols; Stage 3 (Release 4)," 3GPP TS 24.008 V4.6.0 (Mar. 2002).
Third Generation Partnership Project, "Technical Specification Group Core Network; Mobile radio interface Layer 3 specification; Core network protocols; Stage 3 (Release 1999)," 3GPP TS 24.008 V3.11.0 (Mar. 2002).
Third Generation Partnership Project, "Technical Specification Group Core Network; Mobile radio interface Layer 3 specification; Core network protocols; Stage 3 (Release 1999)," 3GPP TS 24.008 V3.15.0 (Mar. 2003).
Third Generation Partnership Project, "Technical Specification Group Core Network; Mobile radio interface Layer 3 specification; Core network protocols; Stage 3 (Release 4)," 3GPP TS 24.008 V4.10.0 (Mar. 2003).
Third Generation Partnership Project, "Technical Specification Group Core Network; Mobile radio interface Layer 3 specification; Core network protocols; Stage 3 (Release 5)," 3GPP TS 24.008 V5.7.0 (Mar. 2003).
Third Generation Partnership Project, "Technical Specification Group Core Network; Mobile radio interface Layer 3 specification; Core network protocols; Stage 3 (Release 5)," 3GPP TS 24.008 V5.3.0 (Mar. 2002).
Third Generation Partnership Project, "Technical Specification Group Core Network; Mobile radio interface Layer 3 specification; Core network protocols; Stage 3 (Release 6)," 3GPP TS 24.008 V6.0.0 (Mar. 2003).
Third Generation Partnership Project, "Technical Specification Group GSM/EDGE Radio Access Network; Multiplexing and multiple access on the radio path (Release 4)," 3GPP TS45.002 V4.7.0 (Apr. 2003).
Third Generation Partnership Project, "Technical Specification Group GSM/EDGE Radio Access Network; Multiplexing and multiple access on the radio path (Release 4)," 3GPP TS45.002 V4.5.0 (Nov. 2001).
Third Generation Partnership Project, "Technical Specification Group GSM/EDGE Radio Access Network; Multiplexing and multiple access on the radio path (Release 5)," TS45.002 V5.9.0 (Apr. 2003).
Third Generation Partnership Project, "Technical Specification Group GSM/EDGE Radio Access Network; Multiplexing and multiple access on the radio path (Release 5)," 3GPP TS45.002 V5.4.0 (Feb. 2002).
Third Generation Partnership Project, "Technical Specification Group GSM/EDGE Radio Access Network; Multiplexing and multiple access on the radio path (Release 6)," 3GPP TS45.002 V6.1.0 (Apr. 2003).
Third Generation Partnership Project, "Technical Specification Group GSM/ESGE Radio Access Network; General Packet Radio Service (GPRS); Base Station System (BSS)—Serving GPRS Support Node (SGSN); BSS GPRS Protocol (BSSGP) (Release 4)," 3GPP TS 48.018 V4.5.0 (May 2002).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 4)," 3GPP TS 48.018 V4.4.0 (Sep. 2001).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 5)," 3GPP TS 48.018 V5.6.1 (Apr. 2003).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 6)," 3GPP TS 48.018 V6.1.0 (Apr. 2003).
Third Generation Partnership Project, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 5)," 3GPP TS 48.018 V5.1.0 (Dec. 2001).
Third Generation Partnership Project, "Technical Specification Group Services and System Aspects; Vocabulary for 3GPP Specifications (Release 1999)," 3G TR 21.905 V3.3.0 (Oct. 2001).
Third Generation Partnership Project, "Technical Specification Group Services and System Aspects; Vocabulary for 3GPP Specifications (Release 4)," 3G TR 21.905 V4.4.0 (Oct. 2001).

(56) References Cited

OTHER PUBLICATIONS

Third Generation Partnership Project, "Technical Specification Group Services and System Aspects; Vocabulary for 3GPP Specifications (Release 5)," 3G TR 21.905 V5.3.0 (Mar. 2002).

Third Generation Partnership Project, "Technical Specification Group Services and System Aspects; Vocabulary for 3GPP Specifications (Release 5)," 3G TR 21.905 V5.6.0 (Mar. 2003).

Third Generation Partnership Project, "Technical Specification Group Services and System Aspects; Vocabulary for 3GPP Specifications (Release 6)," 3G TR 21.905 V6.2.0 (Mar. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.5.0 (Feb. 2002).

Third Generation Partnership Project, "Technical Specification Group GSM/EDGE Radio Access Network; General Packet Radio Service (GPRS); Mobile Station (MS)—Base Station System )BSS) interface; Radio Link Control/Medium Access Control (RLC/MAC) protocol (Release 4)," 3GPP TS 44.060 V4.11.0 (Apr. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.0.0 (Feb. 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.6.0 (Apr. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.2.0 (Apr. 2003).

Third Generation Partnership Project, "Technical Specification Group GSM/EDGE Radio Access Network; Mobile radio interface layer 3 specification; Radio Resource Control Protocol (Release 4)," 3GPP TS44.018 V4.8.0 (Feb. 2002).

Third Generation Partnership Project, "Technical Specification Group GSM/EDGE Radio Access Network; Mobile radio interface layer 3 specification; Radio Resource Control Protocol (Release 4)," 3GPP TS44.018 V4.14 (Apr. 2003).

Third Generation Partnership Project, "Technical Specification Group GSM/EDGE Radio Access Network; Mobile radio interface layer 3 specification; Radio Resource Control Protocol (Release 5)," 3GPP TS44.018 V5.4.0 (Feb. 2002).

Third Generation Partnership Project, "Technical Specification Group GSM/EDGE Radio Access Network; Mobile radio interface layer 3 specification; Radio Resource Control Protocol (Release 5)," 3GPP TS44.018 V5.10.0 (Apr. 2003).

Third Generation Partnership Project, "Technical Specification Group GSM/EDGE Radio Access Network; Mobile radio interface layer 3 specification; Radio Resource Control Protocol (Release 6)," 3GPP TS44.018 V6.2.0 (Apr. 2003).

Third Generation Partnership Project, "Technical Specification Group GSM/EDGE Radio Access Network; Layer 1; General requirements (Release 4)," 3GPP TS 44.004 V4.2.0 (Dec. 2001).

Third Generation Partnership Project, "Technical Specification Group GSM/EDGE Radio Access Network; Layer 1; General requirements (Release 5)," 3GPP TS 44.004 V5.1.0 (Jan. 2002).

Third Generation Partnership Project, "Technical Specification Group GSM/EDGE Radio Access Network; Layer 1; General requirements (Release 5)," 3GPP TS 44.004 V5.2.0 (Feb. 2002).

Third Generation Partnership Project, "Technical Specification Group Radio Access Network; MAC Protocol Specification (Release 4)," TS 25.321 v4.8.0 (Mar. 2003).

Third Generation Partnership Project, "Technical Specification Group Radio Access Network; Physical layer procedures (FDD) (Release 1999)," 3GPP TS 25.214 V3.10.0 (Mar. 2002).

Third Generation Partnership Project, "Technical Specification Group Radio Access Network; Physical layer procedures (FDD) (Release 4)," 3GPP TS 25.214 V4.4.0 (Mar. 2002).

Third Generation Partnership Project, "Technical Specification Group Radio Access Network; Physical layer procedures (FDD) (Release 5)," 3GPP TS 25.214 V5.0.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Radio Resource Control (RRC); Protocol Specification (Release 5)," 3GPP TS 25.331 V5.4.0 (Mar. 2003).

Third Generation Partnership Project, "Technical Specification Group Radio Access Network; Radio Resource Control (RRC); Protocol Specification (Release 5)," 3GPP TS 25.331 V5.0.0 (Mar. 2002).

Third Generation Partnership Project, "Technical Specification Group Radio Access Network; Radio Resouce Control (RRC); Prorocol Specification (Release 4)," 3GPP TS 25.331 V4.9.0 (Mar. 2003).

Third Generation Partnership Project, "Technical Specification Group Radio Access Network; Radio Resouce Control (RRC); Protocol Specification (Release 5)," 3GPP TS 25.331 V4.4.0 (Mar. 2002).

Third Generation Partnership Project, "Technical Specification Group Radio Access Network; Radio Resource Control (RRC); Protocol Specification (Release 4)," TS 25.331 V3.14.0 (Mar. 2003)

Third Generation Partnership Project, "Technical Specification Group Radio Access Network; Radio Resource Control (RRC); Protocol Specification (Release 1999)," 3GPP TS 25.331 V3.10.0 (Mar. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.2.0 (Dec. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.0.0 (Mar. 2002).

Third Generation Partnership Project, "Technical Specification Group Radio Access Network; Physical layer procedures (FDD) (Release 5)," 3GPP TS 25.214 V5.4.0 (Mar. 2003).

Third Generation Partnership Project, "Technical Specification Group Radio Access Network; Physical channels and mapping of transport channels onto physical channels (FDD) (Release 4)," 3GPP TS 25.211 V4.4.0 (Mar. 2002).

Third Generation Partnership Project, "Technical Specification Group Radio Access Network; UE Procedures in Idle Mode and Procedures for Cell Reselection in Connected Mode (Release 4)," 3GPP TS 25.304 V4.6.0 (Dec. 2002).

Third Generation Partnership Project, "Technical Specification Group Radio Access Network; UE Procedures in Idle Mode and Procedures for Cell Reselection in Connected Mode (Release 4)," 3GPP TS 25.304 V4.4.0 (Mar. 2002).

Third Generation Partnership Project, "Technical Specification Group Radio Access Network; Physical channels and mapping of transport channels onto physical channels (FDD) (Release 5)," 3GPP TS 25.211 V5.0.0 (Mar. 2002).

Third Generation Partnership Project, "Technical Specification Group Radio Access Network; Physical channels and mapping of transport channels onto physical channels (FDD) (Release 5)," 3GPP TS 25.211 V5.3.0 (Dec. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

(56) References Cited

OTHER PUBLICATIONS

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; UE Procedures in Idle Mode and Procedures for Cell Reselection in Connected Mode (Release 1999)," 3GPP TS 25.304 V3.10.0 (Mar. 2002).

Third Generation Partnership Project, "Technical Specification Group Radio Access Network; UE Procedures in Idle Mode and Procedures for Cell Reselection in Connected Mode (Release 1999)," 3GPP TS 25.304 V3.12.0 (Dec. 2002).

TSG RAN WG2, "TS RAN S2.01, Radio Interface Protocol Architecture, V0.2.0," TSG-RAN Meeting #3, TSGR#3(99) 259, Yokohama, Japan (Apr. 21-23, 1999).

\* cited by examiner

POINT TO MULTI-POINT SERVICES USING SHARED CHANNELS IN WIRELESS COMMUNICATION

CROSS REFERENCE TO RELATED APPLICATION

This application claims priority from U.S. Provisional Application No. 60/377,037, filed on May 1, 2002, which is incorporated by reference as if fully set forth.

FIELD OF INVENTION

The invention generally relates to wireless communication systems. In particular, the invention relates to point to multi-point services in such systems.

BACKGROUND

There is a growing desire to use point to multi-point services in wireless communication systems. As shown in FIG. 1 in point to multi-point (PtM), one service is sent from a single point, such as a base station 10, to multiple points, such as multiple user equipments $12_1$-$12_3$. Examples of point to multi-point services are multimedia broadcasts and multicast services.

In the third generation partnership program (3GPP) proposed system, one proposed channel that could be used for such services is the forward access channel (FACH). The FACH is a downlink common transport channel (TrCH) that can be received by all users. The FACH TrCH is broadcast by applying it to the secondary common control physical channel (S-CCPCH). The S-CCPCH is transmitted to all the cell users.

To limit the radio recourses utilized by the S-CCPCH, the S-CCPCH data rate is limited. To illustrate, if a high data rate service was transmitted over the S-CCPCH, it would need to be transmitted using a low data redundancy to achieve that high data rate. Since the S-CCPCH is transmitted to the entire cell, it is transmitted at a power level sufficient for reception by a user at the periphery of the cell at a certain quality of service (QOS). Broadcasting a high data rate service at this power level would increase interference to other users reducing the capacity of system, which is extremely undesirable, due to the inefficient use of cell resources.

Additionally, due to the broadcast nature of the S-CCPCH and FACH, the radio resources required for the S-CCPCH and FACH are rather static, due to channel allocation and messaging on these channels being provided at a relatively slow rate by layer 3 signaling techniques. The modulation and coding set (MCS) and transmission power level used by the S-CCPCH needs to be sufficient to maintain a certain QOS at the periphery of the cell. The static nature of the S-CCPCH configuration does not allow dynamic adjustment of these parameters to make efficient use of radio resources. Additionally, scheduling of transmissions also occur at this slow rate, which does not allow for efficient use of this radio resource and does not allow for efficient multiplexing of data streams to each user.

Another channel that can be used for point to point (PtP) services is the downlink shared channels (DSCHs). The DSCHs are shared by multiple users. Transmissions to different users (user equipments) over the DSCH are separated by time. As a result, the DSCHs are time shared channels.

Each user using the DSCH has an uplink and a downlink dedicated control channel. These control channels allow a more efficient radio resource utilization of the DSCHs. These control channels allow for power control for each user's transmission over the DSCH and also allow for beam forming to better separate user transmissions. The DSCH's use of power control and beam forming allows for better resource utilization than provided by FACH channels.

To receive information over the DSCH, a user first monitors its dedicated downlink control channel. A burst in the downlink control channel may have both a first portion and a second portion of a transport format combination indicator (TFCI). The first portion indicates the transport format of the downlink dedicated channel. The second portion indicates existence and the transport format of a subsequent DSCH transmission. If a DSCH transmission to the user is going to be sent to the user, the downlink control channel has the second portion of the TFCI set. The transmission will occur in a subsequent transmission time interval (TTI), after a specified time period. The user then monitors the DSCH for its transmission. To verify that the user is the correct recipient of the DSCH transmission, it checks the transmission for its user identifier. If a transmission is not going to be sent, the second portion of the TFCI is not present on the downlink dedicated control channel.

Although the DSCHs allows for a more efficient utilization of radio resources, only point to point services can be handled. To handle multiple reception points, multiple transmissions are made over the DSCH. Accordingly, transmission to many users requires many transmissions over the DSCH, using valuable radio resources.

Accordingly, it is desirable to have added flexibility in providing wireless point to multi-point services.

SUMMARY

Service data is transferred in a wireless communication system. An indicator is synchronously transmitted for reception by a group of users of a cell in the system. The group of users does not include all of the users of the cell. Each of the group of users receives the service indicator. Each of the group of users monitors for a service identification being transmitted over a downlink shared channel. The service data is transmitted over the downlink shared channel with the service identification. Each of the group of users detects the service identification and receives the service data of the downlink shared channel.

BRIEF DESCRIPTION OF THE DRAWING(S)

DETAILED DESCRIPTION OF THE PREFERRED EMBODIMENT(S)

Although the preferred embodiments are described in conjunction with a preferred 3GPP proposed system, they can be utilized with other wireless systems using point to multi-point transmissions.

Figure 1:
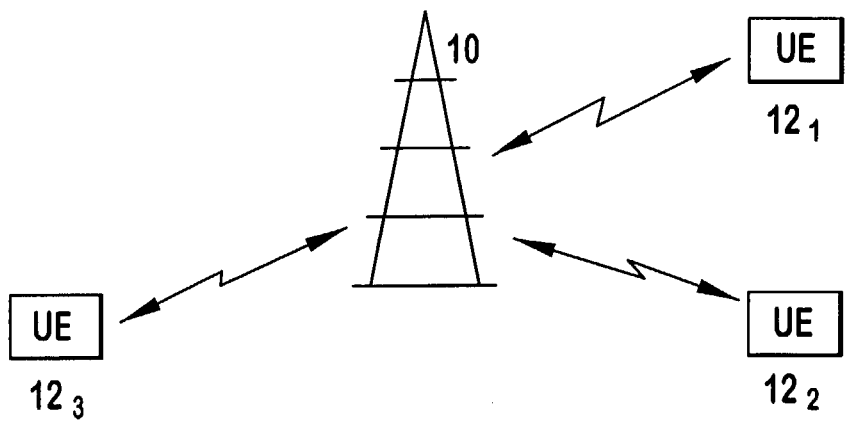
FIG. 1 is an illustration of a point to multi-point service.
Figure 2:
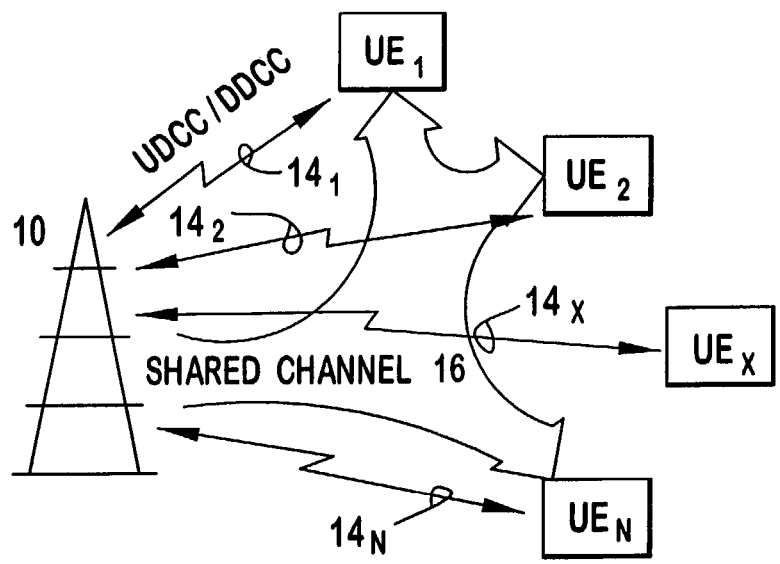
FIG. 2 is an illustration of a preferred shared channel.

FIG. 2 is an illustration of a preferred shared channel 16 and its associated downlink and uplink dedicated control channels $14_1$-$14_N$. Although the preferred embodiment uses downlink and uplink dedicated control channels, the information sent over these channels may, in alternate embodiments, be sent by other means, such as by common physical control channels or layer 2/3 signals. A group of users, UE 1 $12_1$, ..., UE J $12_J$, ..., UE N $12_N$, are to receive a shared service 16. A downlink dedicated control channel $14_1$-$14_N$ for each user is utilized to establish the shared channel and for other control purposes. The shared channel 16 is sent by a base station 10 and is received by the group of UEs $12_1$-$12_N$. UEs, such as UE X $12_X$, do not receive the shared channel allocation indication in their dedicated control channels $14_X$ and do not receive data of the shared channel 16.

Figure 3:
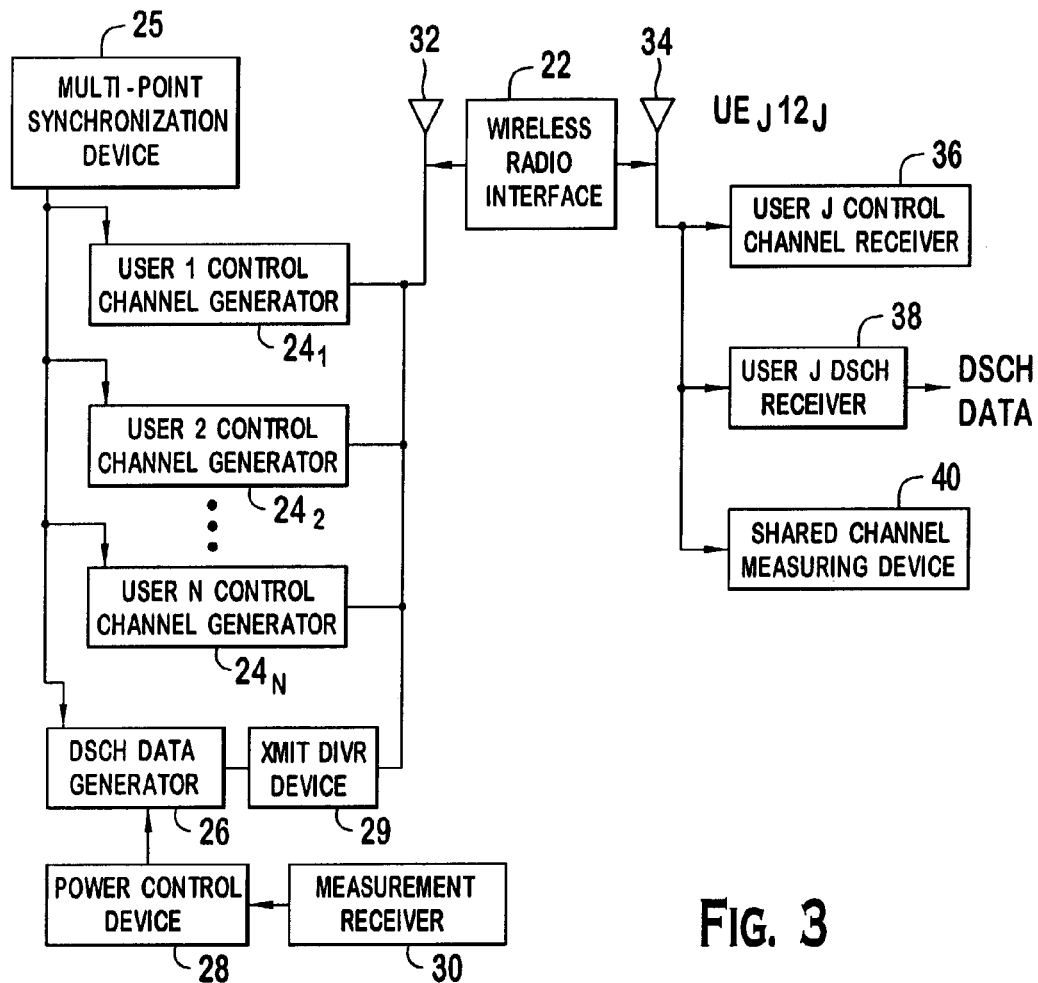
FIG. 3 is simplified diagram of a preferred radio network controller/Node-B and user equipment.

FIG. 3 is a simplified diagram of a RNC 20/Node-B 18 and one of the UEs, UE J $12_J$, for use in transferring data over the shared channel. At the RNC 20/Node-B 18, each downlink dedicated control channel (DDCC) generator $24_1$-$24_N$ produces a control channel signal for each UE $12_1$-$12_N$. A multipoint synchronization device 25 is used to synchronize DSCH allocations to user groups subscribing to a common PtM service on the users' DDCCs. For a UE J $12_J$, after its dedicated control channel is radiated by an antenna 32 or antenna array through the wireless radio interface 22, it is received by an antenna 34 or an antenna array of the UE J $12_J$, and processed by a control channel receiver 36 to recover control information of the channel.

A downlink shared channel generator 26 produces the shared channel signal for transfer through the wireless interface 22. The shared channel signal is received by the UE J $12_J$ using its antenna 34 or antenna array. Information of the shared channel is recovered using the dedicated control channel information by a downlink shared channel receiver 38. A shared channel measuring device 40 takes channel quality measurements/information of the downlink dedicated channel and/or shared channel, for example, received signal code power, relative interference, and block error rate. The measurements/information is sent to the RNC 20/Node-B 18. Typically, this channel quality measurements/information is transmit power commands (TPC), phase shift and amplitude information for use in beam forming, and measured values of received power and interference.

A measurement receiver 30, at the RNC 20/Node-B 18, recovers the channel measurements from all the users of the shared channel. A power control device 28 uses the channel measurements/information to set the power level for the shared channel. Additionally, a transmit diversity device 29 may use the phase shift and amplitude information to set beam forming for the shared channel. Preferably, the power level and beam forming is updated every transmission time interval (TTI), although a longer time period can be used.

The dedicated channels are continuously maintained. The received BLER is used to determine a signal to interference ratio (SIR) target. Based on the received estimated SIR, TPC commands are generated. When the DSCH is activated, the power required is derived from the dedicated channel. However, it is typically not exactly the same, since the BLER requirement and physical configuration differ between them. For a PtM transmission, the transmission power level is set to achieve the desired QOS to the user with the worst reception quality for the PtM transmission. It is also possible to omit users within the PtM user group for which their QoS requirements can not be achieved due to physical limitations in this transmission.

For services having multiple sub-streams of data, the transmission characteristics of the various sub-streams may be handled separately. To illustrate, a multimedia service may have an audio, video and text sub-streams. The QOS of each sub-stream may differ allowing different transmission attributes to be used by each sub-stream. This approach allows for better resource efficiency. Instead of transmitting each sub-stream to meet the highest QOS sub-stream requirements, they can be handled separately on individual DSCH transmissions.

Figure 4:
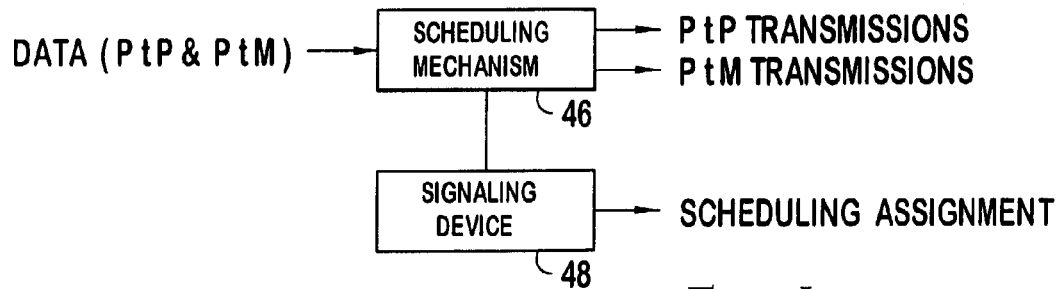
FIG. 4 is a simplified diagram of a preferred radio network controller with a scheduling mechanism for the preferred shared channel.

FIG. 4 is a simplified block diagram of a preferred radio network controller (RNC) 42. The preferred RNC 42 has a scheduling mechanism 46. The scheduling mechanism 46 is preferably used to schedule data every TTI, although a longer scheduling period may be used. The scheduling mechanism 46 receives data to be transmitted over shared channel resources. The received data includes data for PtP and PtM services. The scheduling mechanism schedules the data for transmission in the PtP and PtM transmissions. To schedule the information, the scheduling mechanism 46 considers the QOS required by each transmission including its required data latency and throughput, as well as physical propagation requirements including the total power requirements of the cell and each channel and beam steering information. For each TTI, the scheduling mechanism makes a best use of the cell resources in it's decision to schedule the data transmissions. To illustrate, in a particular TTI the total cell power requirement may be almost reached. If the PtM service can be delayed, the PtM service transmission may be delayed one or two TTIs, until the total cell power requirement drops. If this TTI by TTI flexibility is not available, a resource decision is made and can not be changed over a specified time period, such as 100 ms. or 1 s. In these situations, resources are allocated and not changed in that time period. As a result, certain transmissions that could have been transmitted may not be due to idle allocated resources. The RNC 42 signals to the UEs $12_1$-$12_N$ the channels and the timing of the PtP and PtM transmissions. Scheduling on a TTI basis offers a greater ability to achieve the QOS and data latency requirements while maintaining high utilization of DSCH cell resources. Cell physical channel and PtP/PtM data transmission requirements change dynamically, therefore a scheduling mechanism 46 which can react quickly to these changes offers improved ability to achieve QoS requirements while making the most efficient use of the cells physical resources.

The scheduler 46 may also take into account physical transmission requirements. For example, one user or user group may require a more robust MCS than another. During the next TTI resources may only be available for a less robust MCS. The scheduler 46 may then schedule transmissions for PtP users or PtM user groups that maximize the use of available resources. Since data available for transmission with specific QOS requirements, available physical resources and channel quality measurements change on a TTI basis, the ability to schedule within this interval improves the number of satisfied users and the overall utilization and efficient use of physical resources.

The preferred scheduling for each TTI reduces resource conflicts between services, by reducing the occurrences of idle radio resources. Additionally, the TTI scheduling granularity allows for the changing of PtM transmissions to PtP transmissions and vice versa on the fly. To illustrate, a multimedia service is sent by a PtM transmission to multiple users. For a particular TTI, only one user requires the transmission and the scheduling mechanism 46 schedules that TTIs service transmission as PtP. In the next TTI, multiple users require the service transmission and a PtM transmission is scheduled. Using the preferred scheduling mechanism 46, the PtP and PtM services can be segmented and reassembled over multiple non-contiguous TTI allocations. This scheduling mechanism 46 further increases flexibility of radio resource assignment and results in greater radio resource efficiency.

Figure 5A:
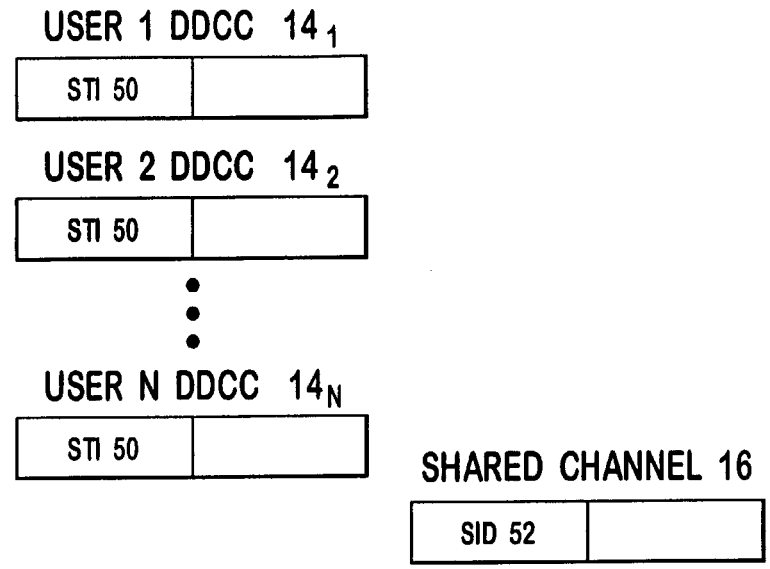
FIGS. 5A, 5B, 5C, 5D and 5E are illustrations of preferred scheduling of signals for the shared channel.
Figure 5B:
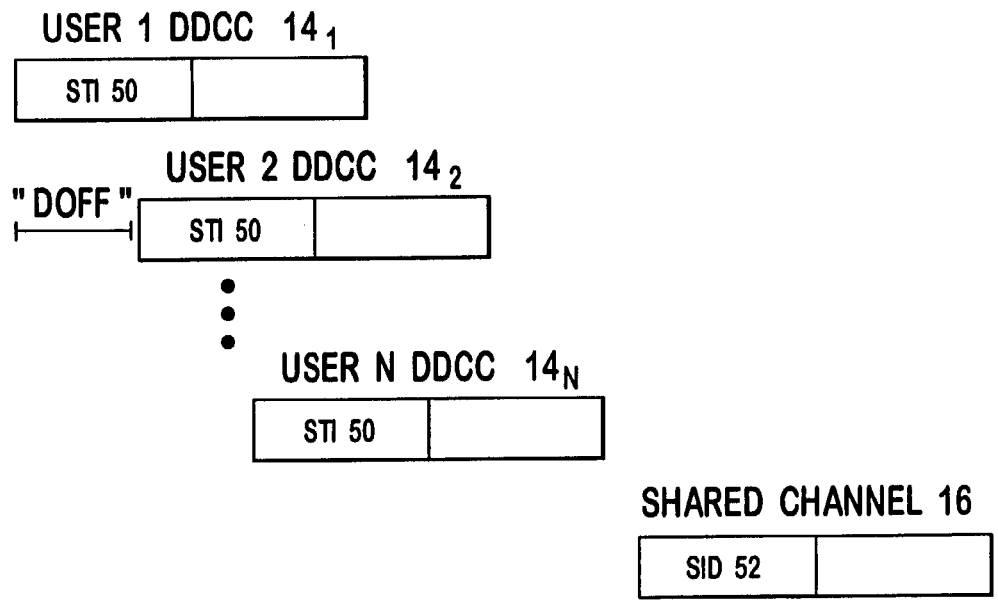

FIGS. 5A, 5B, 5C, 5D and 5E are illustrations of a potential allocation of the shared channel for a PtM service. In dedicated control channels $14_1$-$14_N$ for each user of a PtM user group, user 1 to user N, receiving the service as shown in FIG. 5A, control information is sent. As shown in FIG. 5B for a 3GPP FDD system, there is a chip offset "DOFF" used to stagger start of user TTIs. For each user within the PtM service user group as shown in FIGS. 5A and 5B, a service transmission indicator (STI) 50 is sent along with the dedicated control information. The service transmission indicator 50 indicates that service data will be sent over the shared channel 16. The preferred service transmission indicator is the presence of the second portion of the TFCI in the dedicated downlink control channel burst, although different indicators, such as a bit or word, may be used. After a set time period, the service data is transmitted over the shared channel 16. The transmitted service data, preferably, has an ID 52 associated with the service. This service ID (SID) 52 is used to verify that the correct group of recipients is receiving the transmission.

Figure 5C:
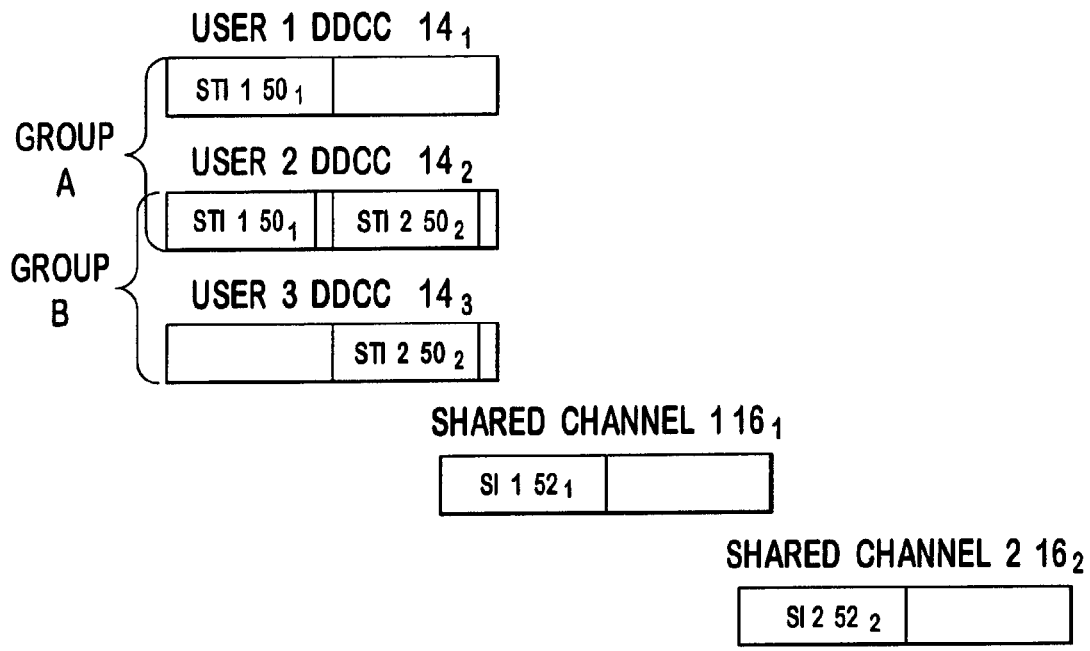
Figure 5D:
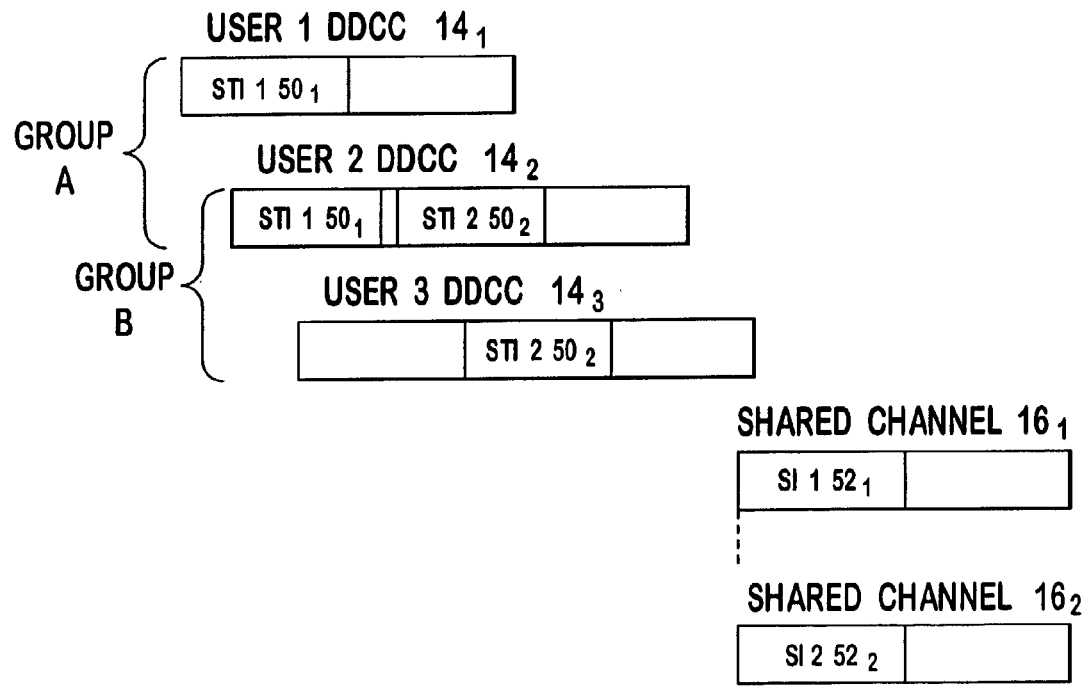

FIG. 5C illustrates the allocation of multiple PtM services. Users 1 and 2 are in group A and receive one PtM service. Users 2 and 3 are in group B and receive another PtM service. A particular user can receive multiple PtM and PtP services. As shown in FIG. 5C, user 2 receives both PtM services. In the DDCCs $14_1$ to $14_3$ for each user, a service indicator $50_1$, $50_2$ is sent to indicate that a corresponding service transmission is being sent over its DSCH. The multiple services may be sent over the same DSCH or multiple DSCHs $16_1$, $16_2$. Each service transmission has its service ID $52_1$ and $52_2$. In FIG. 5D, the STIs $50_1$ and $50_2$ and the DDCCs are staggered in time. However, the transmission over the different shared channels $16_1$, $16_2$ may be simultaneous.

Figure 5E:
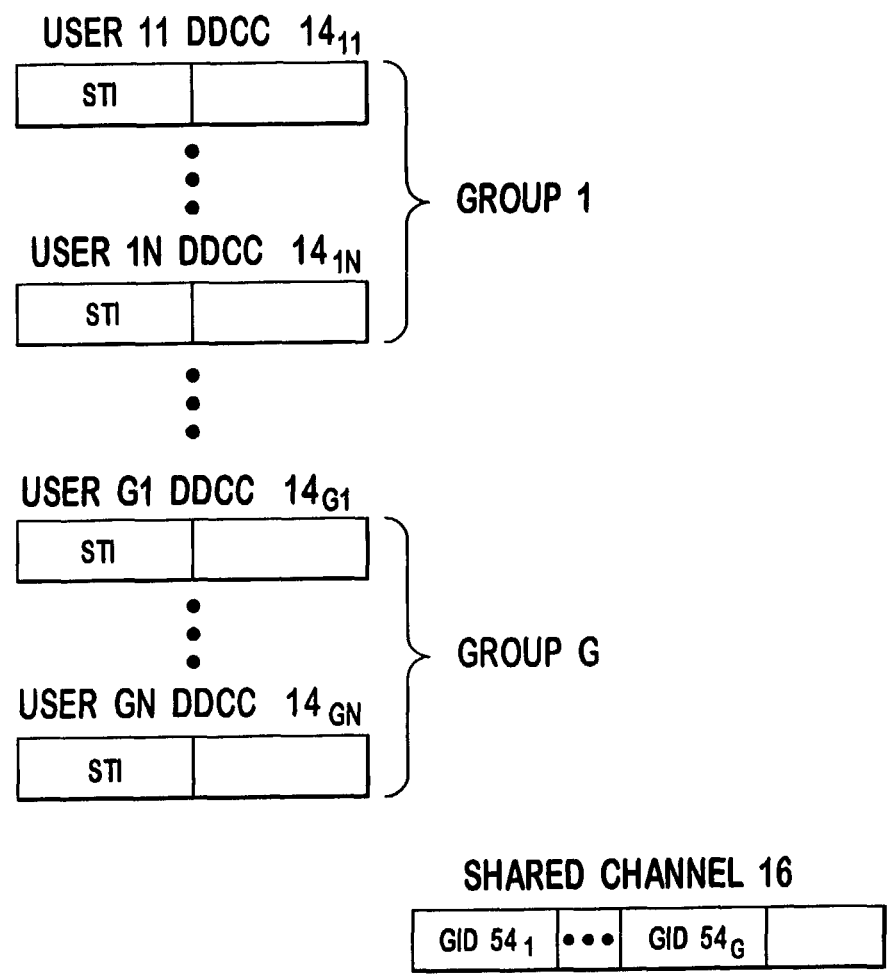

In FIG. 5E for a differing signaling approach, multiple user groups 1-G may be receiving a service. Each user has a DDCC $14_{11}$ to $14_{GN}$ and receives an STI to indicate the PtM transmission. UE groups 1-G are to receive the service. The data transmitted in the shared channel comprises a group ID (GID) $54_1$-$54_G$ for each of the recipient groups.

Figure 6:
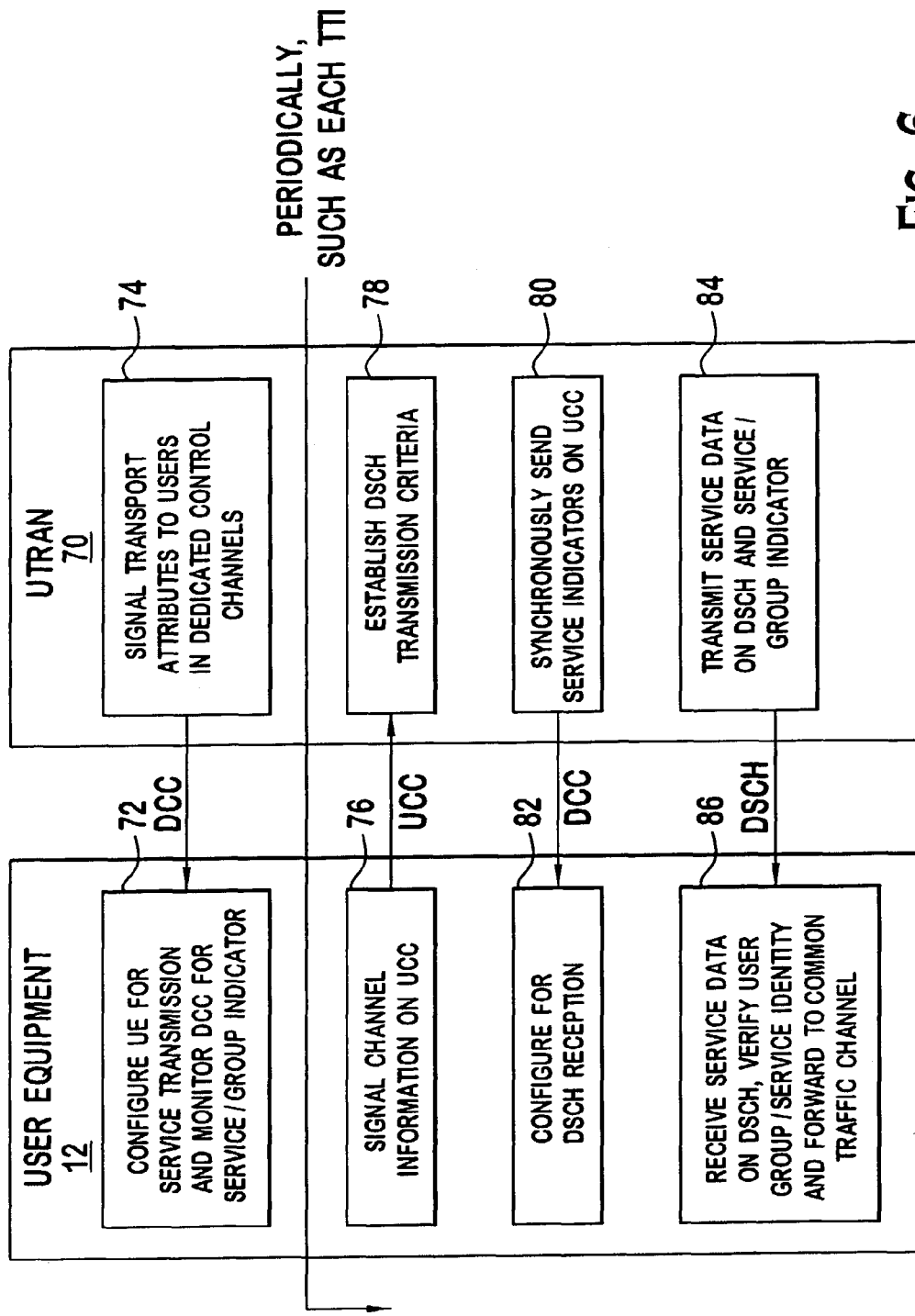
FIG. 6 is an illustration of preferred signals for establishment and transmission of a point to multi-point service over a downlink shared channel.

FIG. 6 is an illustration of preferred signals for establishment and transmissions of a point to multi-point service over DSCHs. The UMTS terrestrial radio access network (UTRAN) 70 signals to each user, user equipment 12, to received the service the transport attributes of the transmission, 74. Data to be sent for the point to multi-point service is received from the core network by the UTRAN 70. Each user of the PtM service may not be activated/configured to receive the service at the same time. Users may register for the service at any time, even when the service is ongoing or the user may register when entering specific PtM service areas. Each user configures itself for reception of the transmission, 72, and monitors it's dedicated control channel for DSCH allocations 82.

Each user maintains uplink and downlink dedicated channels and sends channel information, such as received interference, received power, calculated pathloss and location information, to the UTRAN 70, 76. The received interference and pathloss can also be indicated by use of TPC and location information can be signaled by phase shift indications. Using the channel information for all the users within each PtM user group, the RAN 70 establishes criteria for allocation of the DSCH transmissions, such as transmission power levels and beam forming requirements, 78. To illustrate, if beam forming is not used, the RAN 70 would typically set the transmission power level at a level for reception by the user having the worst reception quality, such as the user having the largest pathloss. If beam forming is used, the power level for each beam is based on the users within the beam having the worst quality. For beam forming, the location information is used to group the users based on their location to establish the number, size and shape of the beams needed to service the group. To optimize the usage of radio resources, these parameters are preferably updated every time transmission interval (TTI), preferably, on each user's uplink dedicated control channel, although a longer time period between updates may be used by transferring equivalent information with layer 3 signaling procedures.

The UTRAN 70 sends the service indicator to the user group(s) on each users dedicated control channel in a synchronized manner, 80. Each user in the group(s) configures itself to receive the PtM transmission, 82.

Since the indication of the shared channel transmission is typically not completely fault tolerant, preferably, an identifier is sent in the DSCH. However, in alternate embodiments, the DSCH identifier may not be used. For PtP services, a specific user identifier is signaled with the DSCH transmission. For the preferred embodiment, a PtM service identifier common to all users within the PtM user group is signaled with DSCH, 84. Each user verifies that either its PtP user specific identifier or the PtM service identifier is sent with the service transmission. The received service data is forwarded to the common traffic channel at the UE $12_1$-$12_N$, 86.

Figure 7:
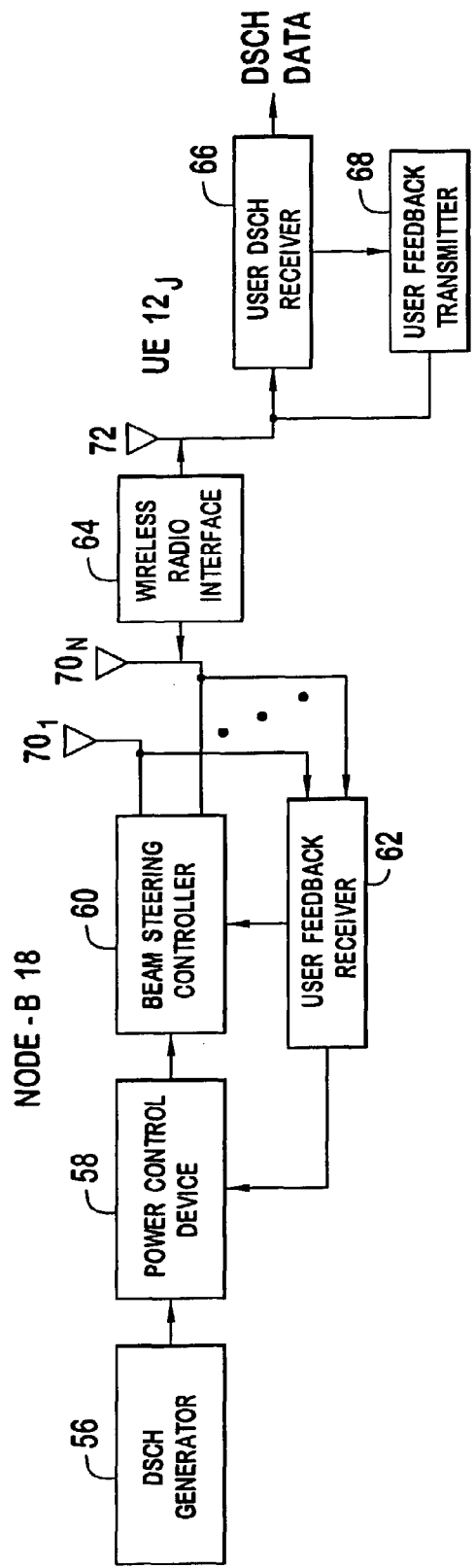
FIG. 7 is a simplified diagram of a preferred Node-B and user equipment using transmission power control and beam steering for a shared channel.

FIG. 7 is a simplified illustration of a Node-B 18 and UE $12_J$ utilizing adaptive power control and beam steering for the DSCH. The UE $12_J$ receives the DSCH over the wireless radio interface 64 using its antenna 72. The DSCH data is recovered by a user DSCH receiver 66. A user feedback transmitter 68 sends channel information, such as TPC and/or phase shift information back to the Node-B 18. The Node-B 18 recovers the channel information from all the users associated with each PtM user group using a user feed back receiver 62.

Data to be sent over the DSCH for each PtM user group is produced by a DSCH generator 56. A power control device 58 establishes the transmission power level of the DSCH or each DSCH beam using the received feedback information. Beams for the DSCH are determined by a beam steering controller 60, which provides appropriate magnitude and weight values to each antenna $70_1$ to $70_N$ of the Node-B's antenna array.

What is claimed is:
1. A user equipment, comprising:
circuitry configured to monitor at least one downlink control channel for information derived from an identification for a group of user equipments,
wherein the circuitry is further configured in response to receiving the information derived from the group identification to receive data over a downlink shared channel;
wherein the circuitry is further configured to monitor at least one downlink control channel for information derived from an identification for a single user equipment;
wherein the circuitry is further configured in response to receiving the information derived from the single user identification to receive data over a downlink shared channel, wherein the received data associated with the group of user equipments is point to multipoint data and the received data associated with the single user equipment is point to point data; and
wherein the received data associated with the group of user equipments is received in a first transmission time inter- val (TTI) and the received data associated with the single user equipment is received in a second TTI.

2. The user equipment of claim 1 wherein the circuitry is further configured to transmit channel quality information and antenna weight information.

3. The user equipment of claim 2 wherein in response to the transmitted channel quality information and antenna weight information, the circuitry is further configured to receive modulation code scheme (MCS) information for the received data associated with the single user identification.

4. The user equipment of claim 3 wherein in response to the transmitted channel quality information and antenna weight information, the circuitry is further configured to receive the data associated with the single user identification processed using the antenna weight information.

5. The user equipment of claim 2 wherein the channel quality information and antenna weight information is transmitted over a control channel.

6. A base station, comprising:
 circuitry configured to transmit at least one downlink control channel having information derived from an identification for a group of user equipments and to transmit data over a downlink shared channel for reception by the plurality of user equipments of the group,
 wherein the circuitry is further configured to transmit at least one downlink control channel having information derived from an identification for a single user equipment and to transmit data over a downlink shared channel for reception by a single user equipment, wherein the transmitted data associated with the group of user equipments is point to multipoint data and the transmitted data associated with the single user equipment is point to point data; and
 wherein the transmitted data associated with the group of user equipments is transmitted in a first transmission time interval (TTI) and the transmitted data associated with the single user equipment is transmitted in a second TTI.

7. The base station of claim 6 wherein the circuitry is further configured to receive channel quality information and antenna weight information.

8. The base station of claim 7 wherein in response to the received channel quality information and antenna weight information, the circuitry is further configured to transmit MCS information for the data associated with the single user identification.

9. The base station of claim 8 wherein in response to the received channel quality information and antenna weight information, the circuitry is further configured to transmit the data associated with the single user identification processed using the antenna weight information.

10. The base station of claim 8 wherein the channel quality information and antenna weight information is received over a control channel.

* * * * *